United States Patent [19]

Ferraro

[11] 4,198,547
[45] Apr. 15, 1980

[54] PULSE CIRCUIT FOR TWO WIRE ELECTRONIC PABX STATIONS

[75] Inventor: Angelo Ferraro, Stillwater, N.Y.
[73] Assignee: Tele/Resources, Armonk, N.Y.
[21] Appl. No.: 946,051
[22] Filed: Sep. 26, 1978
[51] Int. Cl.² ............................................. H04Q 1/50
[52] U.S. Cl. ............................ 179/16 H; 179/16 EA; 179/81 R
[58] Field of Search ................. 179/99, 16 H, 18 AD, 179/81 R, 84 R, 16 E, 16 EA, 16 EC

[56] References Cited

U.S. PATENT DOCUMENTS

| | | | |
|---|---|---|---|
| 3,676,605 | 7/1972 | Johnson | 179/16 H |
| 3,742,151 | 6/1973 | Ruether | 179/99 |
| 3,748,403 | 7/1973 | Schartmann et al. | 179/99 |
| 3,870,831 | 3/1975 | McCarley | 179/99 |
| 4,001,520 | 1/1977 | Waldman | 179/99 |
| 4,086,440 | 4/1978 | Hurle | 179/81 R |

FOREIGN PATENT DOCUMENTS 2432452 1/1976 Fed. Rep. of Germany ........ 179/81 R

Primary Examiner—Bernard Konick
Assistant Examiner—Randall P. Myers
Attorney, Agent, or Firm—Victor J. Toth

[57] ABSTRACT

A pulse shaping circuit, for use with two-wire telephone station sets, such as normally associated with electronic private automatic branch exchange systems. The function of the pulse circuit is to regenerate hook-switch and hold-button control signal pulses for transmission to the common switching equipment as finite loop current interruptions of predetermined pulse width. The circuit overcomes false signalling and signal recognition problems caused by loop-current transient interruptions, and by imprecise manual operation of the station hook-switch and hold-button by station users.

4 Claims, 5 Drawing Figures

PULSE CIRCUIT FOR TWO WIRE ELECTRONIC PABX STATIONS

FIELD OF THE INVENTION

This invention relates to an impulse shaping circuit for shaping line disconnect and line hold control signal pulses to be delivered over the tip and ring leads of two wire telephone station sets used with electronic private automatic branch exchange systems.

BACKGROUND OF THE INVENTION

There exists at least two relevant trends in the voice telephone terminal equipment industry which have given rise to the need for my invention: the first is reflected in the efforts of private automatic branch exchange (PABX) designers and manufacturers to merge key system functions into more sophisticated combinations of PABX common control equipment and associated telephone stations. The second is reflected in the efforts of key telephone system (KTS) designers and manufacturers to merge certain PABX features, including reduced requirements for station cabling, into more efficient electronic key telephone systems. This is illustrated, for example, by the electronic key telephone system shown in U.S. Pat. Nos. 3,637,939, issued Jan. 25, 1972; 3,843,845, issued Oct. 22, 1974; and 3,973,085, issued Aug. 3, 1976.

In both instances, and as one means of achieving at least some of their respective technical and functional objectives, manufacturers and designers have redistributed many of the traditional control functions from either the PABX or KTS common equipment to the station, and have otherwise employed sophisticated station electronics. One characteristic feature of the convergence of key system and PBX technology is reflected in the near elimination of the normally required multi-pair cabling system traditionally used with key systems or key system/PBX combinations, and now being replaced by so called "skinny wire" systems, or systems which use from three to as few as one pair of wires between the station telephone and the electronic PABX or key telephone system common equipment.

As a result of reducing the amount of cable connecting the stations to the common equipment, there now exists fewer cable pairs, or leads, over which to transmit the speech communications and the many forms of control signalling which normally operate between the station and common equipment. Thus, leads which were formerly dedicated to certain control functions—such as the A A1 L and LG leads of conventional 1A2 key telephone systems—have now been eliminated in the interest of reducing the amount of cabling required; meanwhile greater use of station electronics is serving to achieve or even expand the level of station control signalling capability.

New electronic stations typically use a separate data pair to the common control equipment to transmit station control signals in the form of either electronic pulses, or frequency tones. Speech signals and network control signalling, including ringing signals from the common control to the station, are transmitted over a separate, dedicated talking pair in the manner of conventional PBX systems. In such systems, however, problems arise in connection with efforts to return station status or other station control signals to the common equipment in a manner which will not interfere with the station's ordinary ability to receive ringing signals, and without otherwise exposing the station control electronics to potentially hazardous conditions which might occasionally be transmitted inadvertently over the ringing signal path. For example, and depending on how much control signalling is to be originated in the station and transmitted to the switching equipment, the control signalling circuitry at the station end of the loop must be able to generate a variety of discernable control signals without blocking or distorting ringing signals to be received by the station network. The control signals generated from the station are usually low voltage current pulses of various duration, generated by manually interrupting the normally present loop current, or "talk battery"; the ringing signals are low frequency signals of relatively high voltage, usually in the range of 80 to 120 volts AC.

Where a single pair of wires is to be shared for the transmission of all station control signals, and where the various control signals consist merely of loop current impulses of varying duration, faulty station control signals frequently occur due to the inability of the switching equipment to discern or identify the signal being transmitted from the station. Also, where the pulse signal is manually mechanically initiated, an erroneous control signal may be generated by (1) improper operation of the manual signal initiating device by the user, or (2) a faulty mechanical device. In such instances the station control signal pulse may be misinterpreted by the switching equipment, resulting in an improper line disconnection or other unintended operation on the line.

Among the kinds of station control signals transmitted over two-wire station loops associated with electronic switching equipment and stations are the line disconnect and line hold signal functions. These signals are typically initiated at the station by depressing the hook switch to disconnect the line, and by depressing a hold button (or, alternatively, the hook switch again in the case of some systems) to signal that a presently connected line should be put on hold, and the talk path made available for other use. Where loop current pulses of varying width or duration are used for the control signal, it is imperative that the pulses be generated accurately and uniformly in order that they might be interpreted properly by the switching equipment. Otherwise, one signal may be misinterpreted for another, or a received signal may not be recognized at all. In fact, it is frequently the case that users manually depress the hold button (or hook switch) longer than necessary, and thereby generate a loop current pulse of excess duration which is misinterpreted as a line disconnect signal. On the other hand, users frequently mislay the station handset when intending to return it to the hook switch at the completion of a call, such that the hand-set "bounces" off the hook switch, thereby sending a momentary pulse to the switching equipment which, in turn, would be misinterpreted merely as a "hold" signal, rather than a line disconnect signal.

The ability of the switching equipment to recognize and thereby respond to the station control signal is further impeded by long station loops—particularly in the case of off-premises extension (OPX) loops. Longer loops expose the control signals to transients, and increase the amount of pulse spreading. Either or both of these conditions can cause the original pulse characteristics to be lost, particularly in the case of manually or mechanically generated pulses of marginal original quality. Pulse distortion interferes with the ability of the switching equipment to recognize or discriminate between various control signals.

DESCRIPTION OF THE PRIOR ART

As pointed out above, it is well known in the prior art that improvements may be achieved in the signalling functions between the station instruments and the switching equipment through the increased usage of station electronics in traditional circuits, such as the hold circuit, or inline card circuits generally. However, and as illustrated by U.S. Pat. No. 3,715,516, issued Feb. 6, 1973, while greater use of and reliance on station control signalling has evolved in the field of electronic telephone switching systems, little if anything has been done to improve the quality of the station signal in the case of single line, or two-wire station telephones used with either electronic PABX, key telephone systems, or even electronic central office switching systems. U.S. Pat. No. 3,789,154, issued Jan. 29, 1974, discloses some of the problems of adapting conventional two-wire telephone sets for use with electronic switching equipment. However, this patent does not address a solution to the pulsing problems eliminated by my invention. U.S. Pat. No. 3,895,192, issued July 15, 1975, discloses an improved hold control circuit responsive to station control pulses, but used only in the context of conventional multi-wire key telephone stations. It has no application in two-wire systems, such as that contemplated by my invention. Finally, U.S. Pat. Nos. 3,870,831, issued Mar. 11, 1975; 4,001,520, issued Jan. 4, 1977; and 4,011,413, issued Mar. 8, 1977, disclose hold control circuits for use with conventional two-wire or single line telephone stations, but which have no application in the context of associated electronic switching equipment.

In summation, a problem exists in that manual operation of the mechanical hook switch and hold button devices in two wire telephone stations in the conventional manner contributes to the generation of station loop current transients, and loop current pulses of imprecise duration. Both of these possible conditions result in false signals being received by the EPABX switching equipment. A further problem is presented in that the station loop current is vulnerable to transient interruptions from a variety of sources. In addition, loop current impulses transmitted over long loop lengths are susceptible to the form of distortion known as pulse spreading. Each of these conditions further contributes to false signalling, or signal recognition problems when loop current pulses are used as the signalling mechanism for more than mere line disconnection functions.

A further problem is presented in that the interpositioning of additional pulse shaping circuitry between the switch and the station network and ringer may interfere with normal signalling operations, including passage of station ringing signals.

A further problem is presented in that, as a result of the prevailing level of keen competition in the field of voice telephone terminal equipment products, any improvement in the use of tip and ring leads for control signalling purposes must be achieved by simple and inexpensive means.

Accordingly, it is one object of my invention to provide a loop current pulse circuit for use with two-wire telephone stations associated with an electronic private automatic branch exchange, to facilitate the recognition and transmission over the station tip and ring leads without interfering with the passage of speech and network control signals of line disconnect, line hold and other desired station originating control signals.

It is a further object of my invention to provide a loop current pulse circuit which will generate discrete and finite control pulses, easily distinguishable from transient interruptions in the loop current.

It is a further object of my invention to provide a pulse circuit which is capable of generating finite loop current pulses to be transmitted over long loop lengths.

It is a further object of my invention to provide a pulse circuit which will withstand without electrical damage, high voltage transients of up to 1,000 volts likely to be introduced onto the station loop by sources such as lightening surges.

It is a further object of my invention to achieve the above objectives in an economical and reliable manner.

SUMMARY OF INVENTION

In furtherance of these objectives I have designed an inexpensive pulse circuit for use with two-wire station telephones which provide precisely defined loop current pulses of predetermined pulse widths in response to the corresponding manual operation of the station hook switch, hold button, or other station signalling device.

The pulse circuit is a two-port network with at least one additional control input. The pulse circuit is interposed on the tip and ring leads between the central switch and the station network and ringer. The control input is connected to a feature hold button assembly, or other similar control device. When the station is off-hook, or in the conversation mode, loop current flows uninterrupted through the pulse circuit and on through the telephone station network. When the station hook switch is depressed, the flow of loop current is interrupted by breaking the hook switch contacts in the conventional manner. Termination of the station loop current flow in the foregoing manner is ordinarily interpreted by the PABX as a signal to disconnect the station line—provided that the loop current interruption is of sufficient duration. The pulse circuit of my invention assures that the loop current remains interrupted for a sufficient period of time. It employs for this purpose the combination of a constant current source, timing capacitor, silicon bilateral switch, and triac to maintain a loop current interruption (i.e., a signaling pulse), of at least a predetermined duration.

Once the loop current is interrupted, it will be precluded by the pulse circuit from flowing to the station network until the triac, interposed in the tip path, is returned to the conductive state. The period during which the triac remains nonconducting determines the minimum loop current pulse duration of the line disconnection signal. The nonconducting state of the triac is maintained until the timing capacitor applies a trigger voltage, via a bilateral switch, to the gate of the triac. The rate at which the necessary triggering voltage is attained is, in turn, determined by the rate at which the constant current source delivers current to the timing capacitor. By selecting a constant current source of the correct value, the triggering voltage can be delayed for any predetermined length of time. This permits loop current interruptions, or pulse signals, over a range of desired minimum duration to accommodate, for example, a variety of electronic PABX or even electronic key system designs.

The pulse circuit is responsive to other station signal inputs, such as "hold" pulses, via a control lead. When the station hold button is depressed, the tip lead is shorted to a capacitor by an arrangement which effectively turns off the triac in the tip lead, as though the hook switch had been depressed. This similarly establishes an interruption in the loop current which, if maintained within the permissible design range of the associated PABX, will be recognized by the PABX as a control signal to put the line on "hold." However, in order that this second signal not be confused with the minimum pulse signal employed for line disconnection purposes, the timing capacitor which triggers the gate of the triac is charged at a different rate. This second charging rate is determined by switching the charging capacitor to a second constant current source which delivers charging current at a different predetermined level.

Additional discrete control signal pulses can be delivered to the PABX switch in a similar manner, simply by adding additional constant current sources, or combining the current sources in varying combinations so as to alter the charging rate of the timing capacitor and thereby maintain the normally conducting triac in an off state for any desired time duration.

BRIEF DESCRIPTION OF THE DRAWINGS

The foregoing and other features of my invention may become more apparent by refering now to the drawing in which.

DESCRIPTION OF THE PREFERRED EMBODIMENT

Figure 1:
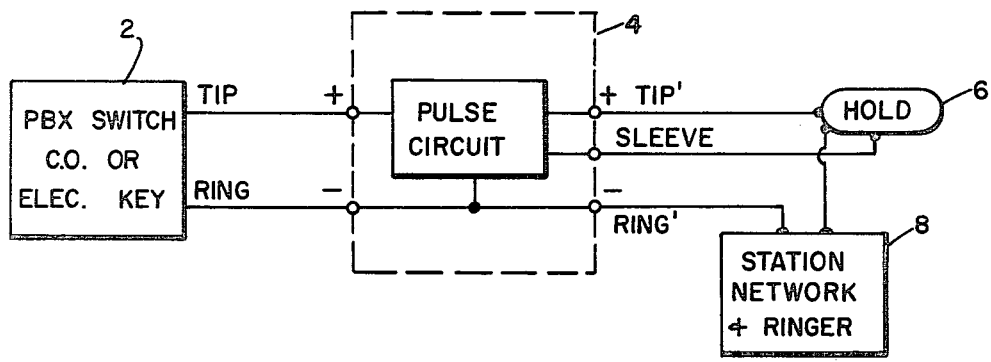
FIG. 1 shows the pulse circuit interposed between the tip and ring leads of a station loop from electronic switching equipment, and the telephone network of a conventional single line telephone station instrument.

FIG. 1 shows the pulse circuit 4 of my invention interposed in the path of the tip and ring leads of the station loop between the electronic common controlled switch 2 and the station network and ringer 8. It is contemplated that the pulse circuit represented by block 4 will ordinarily be housed within the station instrument. Alternatively, it can be located remote from the instrument, such as at the main (MDF) or intermediate distribution frame (IDF). This alternative is likely to be employed, for example, where the pulse circuit is used to improve the transmission of control pulses originating from conventional off-premise extension (OPX) stations, including multibutton station instruments, for transmission over long central office two-wire loops to switching equipment located at a distant premise location. Block 2 further illustrates that the pulse circuit of my invention is not restricted to use with PBX stations, but may also be used in other two-wire station loop applications, such as with electronic central office switching equipment or electronic key system equipment.

The pulse circuit illustrated by block 4 is a two-port network, with input port for tip and ring, and output port for TIP' and RING'. There is also at least one additional control input, the sleeve lead, from a conventional hold button assembly 6, which is a single pole, single throw normally open switch, with the switch output connected to TIP'.

Figure 2:
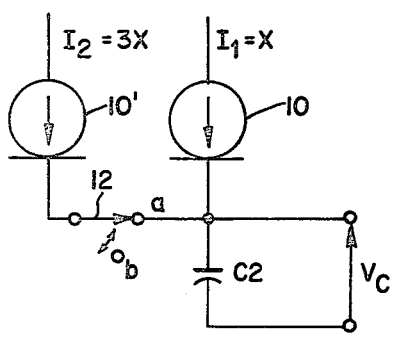
FIG. 2 illustrates the circuit mechanism of my invention by which loop current pulses of different predetermined duration can be simply achieved by combining constant current sources feeding timing capacitor, C2.

FIG. 2 illustrates the mechanism of my invention which controls the generation of loop current pulses of various predetermined duration. Constant current source 10 supplies current $I_1$ to timing capacitor C2 at a predetermined rate of X milliamps. Similarly, constant current source 10' also supplies current $I_2$ at a predetermined rate of 3X milliamps when electronic switch 12 is closed. $I_1$ and $I_2$ combine to supply charging current to timing capacitor C2 at a rate of 4X milliamps; when electronic switch 12 is open, timing capacitor C2 is charged at the lesser rate of X milliamps. Electronic switch 12 is operated in response to the hold button assembly 6 in FIG. 1.

Although not shown, it is contemplated by my invention that additional constant current sources and associated electronic switches responsive to other input signals could be employed in the pulse circuit to provide a greater number of distinct loop current pulse control signals. By operating the associated electronic switches in response to different station signalling sources, and in conjunction with electronic switch 12, timing capacitor C2 can thereby be charged to voltage level $V_c$ at many different, predetermined rates.

Figure 3:
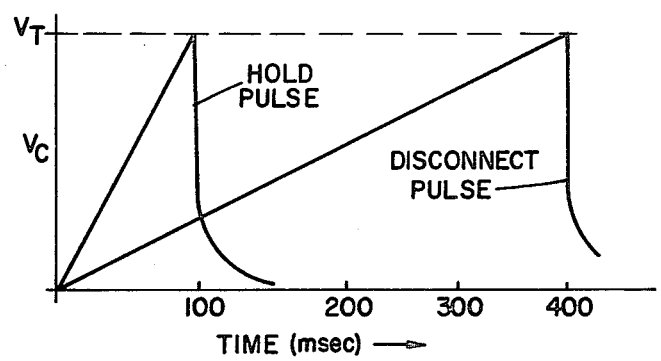
FIG. 3 illustrates the relative rates at which the trigger voltage level is attained in capacitor C2, in order to produce descrete control signal pulses of predetermined duration.
Figure 4:
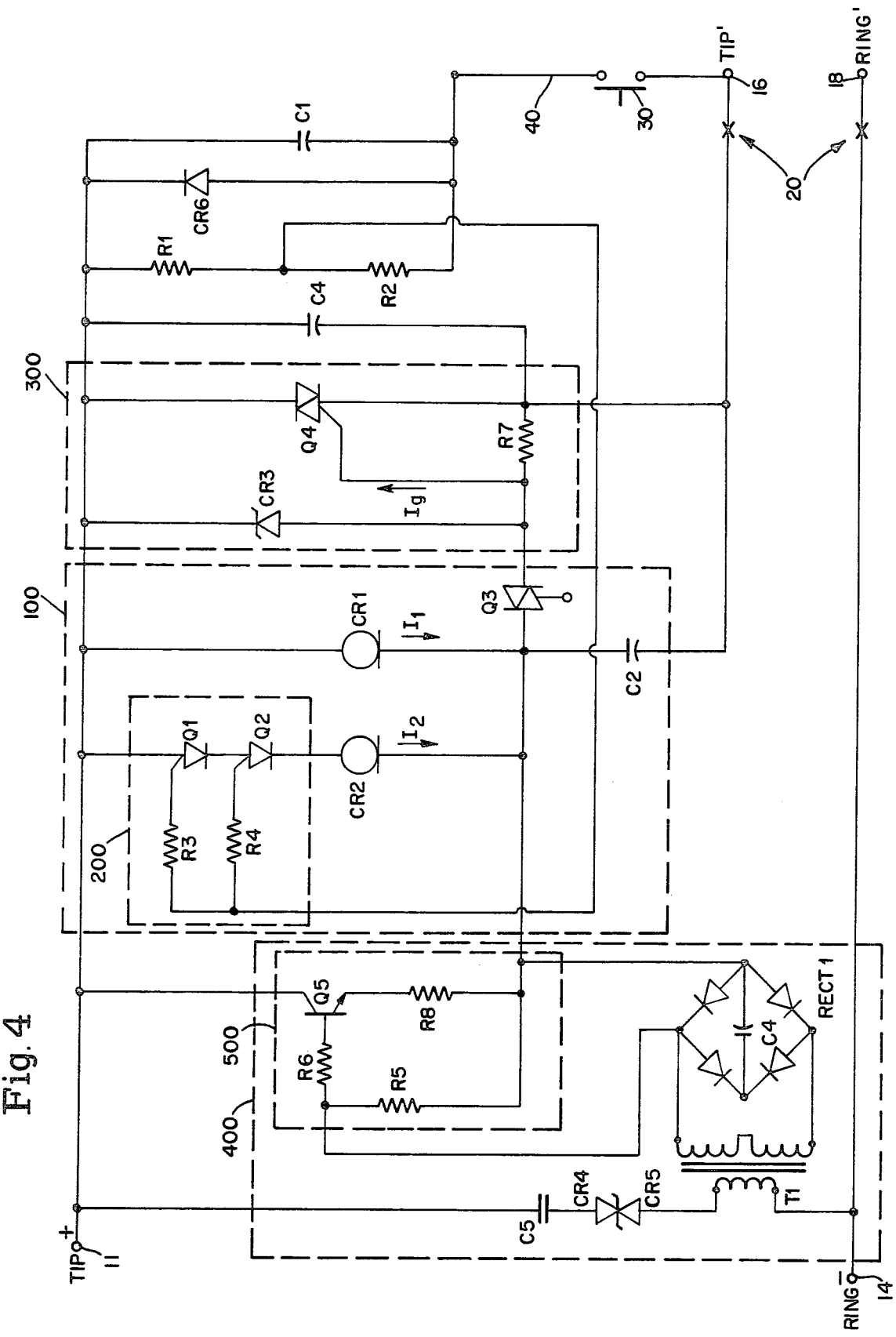
FIG. 4 shows the preferred embodiment of the pulse shaping circuit of my invention.

FIG. 3 illustrates the resulting rates at which the voltage $V_c$ across the charging capacitor C2 in FIG. 2 reaches the trigger voltage level $V_T$ which, in turn, controls the loop current pulse shaping characteristics achieved by the detailed circuitry shown in FIG. 4.

FIG. 4 shows the preferred embodiment of the pulse shaping circuitry of my invention. An understanding of the operation of the pulse circuitry can be obtained from the following illustrative discussion pertaining to two common station control functions—line disconnect and line hold signalling.

A station line disconnect pulse is a signal usually transmitted as a loop current interruption which signals the PBX or other switching equipment that the conversation is terminated. After completion of a conversation the user replaces the station handset onto the hook switch 20, thereby opening the TIP' and RING' connections 16 and 18, respectively, to the station network (not shown). In this condition, loop current normally does not flow at a perceptible level, thereby signalling the associated switch to disconnect the line. However, in the not uncommon event of a misplacement of the hand set on the hook switch, (a condition frequently characterized as hand set "bounce"), the loop current interruption is only momentary, at best, and may be misinterpreted by the switching equipment as a mere line hold or other control signal. My invention assures that every depression of the hook switch, no matter how momentary, will be interpreted properly as a signal to the switching equipment to disconnect the line. This is accomplished in the following way:

Whenever hook switch 20 is depressed, TRIAC Q4 in block 300 is put into an OFF state whereby it supports the entire talk battery (usually 48 volts). Once Q4 is put into the OFF state, no loop current can flow. Q4 is maintained in the OFF state by the circuitry of block 100 for a sufficient period of predetermined time duration to assure that the loop current interruption will be properly recognized by the switching equipment as a line disconnect signal.

With reference to block 100, the OFF state of Q4 of minimum duration is attained by constant current diode CR1 which delivers a constant current $I_1$ to the timing capacitor C2, thereby charging capacitor C2 at the rate illustrated by the slower of the two linear voltage ramps shown in FIG. 3. When the voltage $V_c$ on C2 equals a predetermined trigger voltage $V_T$ established by silicon bilateral switch Q3, the accumulated charge on C2 is dumped into the gate of TRIAC Q4, thereby turning Q4 ON.

Once Q4 is turned on, loop current is permitted to flow through the telephone station network in the conventional off-hook state, rendering a fresh dial tone, a sign of a new line connection. In the case of inadvertent hand set "bounce," after a predetermined time established by the switching equipment, the dial tone would be replaced by an error tone in a conventional manner.

Two particular advantages should be apparent from the foregoing description of the operation of my invention in the context of the line disconnect function. First, the pulse circuit assures that the mere momentary depression of the hook switch by an anxious user who desires to terminate one conversation and immediately have access to a fresh line will, in all cases, be recognized by the switching equipment as a signal to disconnect the line. Otherwise, such momentary depressions of the hook switch by the anxious user might be misinterpreted as a mere hold signal, or other station control signal. Second, the pulse circuit assures that, in the case of inadvertent hand set "bounce", the originally connected line will be disconnected and, after the minimum period of loop current interruption maintained by TRIAC Q4, a fresh line will be connected to the station, beginning a new control cycle within the switching equipment. As a result of employing my invention, the switching equipment will be able to recognize that an inadvertent condition is present at the station, and in response thereto disconnect the line and replace dial tone with an error tone. Otherwise, the momentary loop current pulse generated by the inadvertent "bounce" of the hand set off the hook switch would likely be misinterpreted as a mere "hold" signal, to which the switching equipment would respond by placing the line in a hold state for an indefinite time, rather than terminating the call by disconnecting the line.

For the purpose of deriving a disconnect pulse of the desired predetermined duration, component values should be selected according to the following relationship:

$$t = CV_T/I$$

where
  t = the desired pulse duration;
  C = capacitance of C2;
  $V_T$ = trigger voltage of Q3; and
  I = constant current of source CR1.

For the purpose of my invention, a constant current source was selected as the mechanism for controlling the charging rate of timing capacitor C2 to avoid problems likely to be otherwise encountered by the expected variance in the available power sources used with telephone switching systems.

The station line hold signal is usually also an interruption of the station loop current of a predetermined momentary duration. For purposes of my invention the hold signal is initiated by depressing a hold button assembly 30 across TIP' 16, and the control lead 40. When sleeve 40 is shorted to the TIP' 16, Triac Q4 is capacitively commutated by C1, thereby effectively turned OFF, while the TIP line 11 is effectively opened with respect to the station network and ringer (not shown) connected at 16 and 18. The timing sequence involving capacitor C2 and silicon bilateral switch Q3 is begun again, as described above for the disconnect pulse. However, timing capacitor C2 is now charged at a faster rate by current $I_2$ from constant current diode CR2, in addition to current $I_1$. Constant current source CR2 in block 100 is turned on by the switch 200, comprised of series programmable unijunction thyristors Q1 and Q2, and resistors R3 and R4. By selecting higher cost components capable of withstanding higher voltages, the combination shown in block 200 of Q1, R3 and Q2, R4 could be replaced by one resistor and one thyristor. Switch 200 is turned ON during the moment that Triac Q4 is being turned OFF, or in other words during the commutation operation. The sum of the two constant current sources CR1 and CR2, and their respective currents $I_1$ and $I_2$ charge the timing capacitor C2 at a proportionately faster rate with a linear voltage ramp like that shown in FIG. 3, and according to the relationship $t = CV_T/I$ above. This, in turn, generates a shorter pulse, thereby making the hold and disconnect pulses distinct.

As pointed out above, one of the advantages of my invention is that ringing voltage may pass to the station ringer without deleterious interruption. Ringing voltage is controlled by the operation of Triac Q4, which passes current in both directions, and zener diode CR3. When the ringing voltage exceeds the breakdown of zener CR3, which is set above the maximum expected talk battery voltage, the gate current $I_g$ increases, turning Triac Q4 ON during the positive half cycle of the ringing voltage. During the negative half cycle of the ringing voltage the zener is essentially a forward biased diode (−7 volts), and the Triac turns on almost immediately. Improved precision may be obtained by employing an avalanche diode in conjunction with the Triac.

Figure 5:
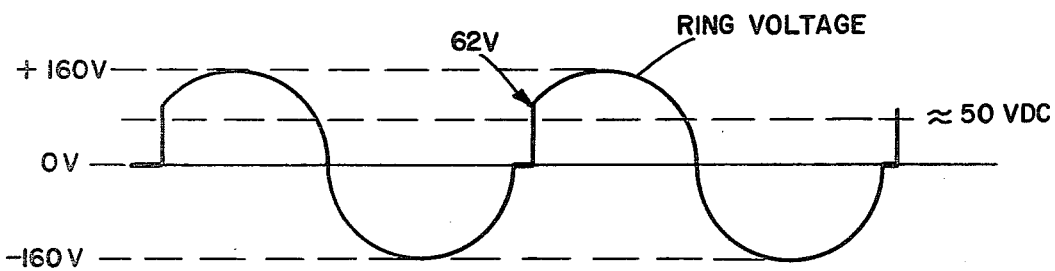
FIG. 5 illustrates the negligible adverse effects of the interposed pulse shaping circuitry on the passage of ringing signals to the station ringer.

FIG. 5 illustrates a typical sinusoidal ringing voltage signal, as it would be affected by my invention. Where a 48-volt talk battery supply is used (shown in FIG. 5 as a nominal 50-volts dc), the zener CR3 is selected with a breakdown voltage above this level, such as at 62 volts. The resulting waveform is only slightly distorted, being turned on during the positive half cycle at a slightly later stage of the ring cycle. The Triac Q4 blocks the talk battery, but allows the ringing signal to pass with pseudo phase control. However, this slight distortion is completely filtered by conventional station ringers, such that no perceptible ringer disturbance results.

Contained within block 400 is certain support circuitry ancillary to my invention. The circuitry defined by block 400 monitors the TIP to RING voltage between points 11 and 14, through the series of components consisting of capacitor C5, diodes CR4 and CR5, and the primary of transformer T1. If the line voltage across points 11 and 14 is small (e.g., less than ±15 volts) the control circuitry 400 is effectively disconnected. This feature prevents the attenuation of the voice or audio signals. If, however, the line voltage is increased, such as to the level of the ringing voltage, the resonant circuit of capacitor C5 and the primary of transformer T1 delivers some of the increased voltage to the secondary of transformer T1. The attenuated energy of the ringing signal is rectified by rectifier bridge RECT 1, and stored in capacitor C4. The voltage which is developed across the capacitor C4 is presented to the base of transistor Q5 in block 500, through the bias circuitry comprised of resistor components R5, R6 and R8. The transistor Q5 behaves as a switch when ringing voltage is present, and presents a high conductance path to the gate of Triac Q4. The condition established by this support circuitry compensates for the delay in the flow of loop current to the station in response to an off-hook signal which would otherwise occur while Q4 was being turned ON. This is accomplished by eliminating the disconnect timing sequence, thereby permitting loop current to flow immediately.

Resistor R7 in block 300 is optional, and is used to increase the dv/dt capability of Triac Q4 by improving its temperature operating range, and to compensate for the leakage current of the zener CR3. Capacitor C4 is used as a snubber, also to increase the dv/dt characteristics of Q4. CR6 is a protection diode for capacitor C1; resistors R1 and R2 are bleeder resistors for C1, to dissipate residual charges on C1 after the commutation operation.

What has been described is considered only illustrative of the principles of this invention. Other embodiments can be devised by one skilled in the art without departing from the spirit and scope thereof.

What is claimed is:

1. In a private automatic branch exchange system, the combination including a plurality of two wire telephone station sets wherein the telephone station sets transmit line and network control signalling to and receive speech and ringing signalling from a central control unit over a single common pair of wires comprised of a TIP and RING lead, and wherein conventional loop current is normally present on said pair of wires while the telephone station sets are off-hook, and wherein one or more of the telephone station sets are each equipped with a conventional switch hook and a separate hold button assembly, and wherein each telephone station set so equipped is further equipped with a loop current pulse shaping circuit, including first circuit means connected in the TIP path of said pair of wires and responsive to a control signal for interrupting the normal passage of station loop current during corresponding OFF states of said first curcuit means to shape loop current line control pulses of predetermined duration to be transmitted to said central control unit over said pair of wires, second circuit means connected to said first circuit means, said second circuit means activated by a predetermined trigger voltage level for generating and transmitting said control signal to said first circuit means, third circuit means, including a plurality of switchable constant current sources, connected to said second circuit means for generating said trigger voltage level, and circuit switching means independently responsive to said switch hook and hold button assembly for selectively connecting said constant current sources of said third circuit means so as to generate said trigger voltage level at at least two distinct and different rates corresponding to the desired pulse duration of said loop current line control pulses.

2. In a private automatic branch exchange system, the combination of claim 1 wherein said first circuit means includes:

a triac in the TIP path of said wire pair for passing all speech, control and ringing signals only while in the ON state; and wherein said second circuit means includes a timing capacitor and;

a silicon bilateral switch, the output of which is connected to the gate of said triac and the input of which is connected across said timing capacitor, for controlling the passage of said control signal to the gate of said triac when said trigger voltage level accumulates across said timing capacitor; and wherein said third circuit means includes constant current diodes as the constant current sources; and wherein said circuit switching means includes a gated, normally open thyristor switch, the gate of which is controlled to close said switch in response to the depression of said hold button assembly.

3. In a private automatic branch exchange system, the combination of claim 2 wherein at least one of said telephone station sets is situated at a distant off-premise location and is connected to the private automatic branch exchange by a conventional two wire off-premise extension line.

4. In a private automatic branch exchange system, the combination of claim 1 wherein said loop current pulse shaping circuit is located remote from said telephone station set and wherein an extended sleeve lead connects said hold button assembly and said remote pulse shaping circuit.

* * * * *